United States Patent [19]

Dunne

[11] 4,336,887
[45] Jun. 29, 1982

[54] EYE GLASS, RING AND WATCH HOLDER

[76] Inventor: Peter F. Dunne, P.O. Box 6201, Hayward, Calif. 94540

[21] Appl. No.: 158,682

[22] Filed: Jun. 12, 1980

[51] Int. Cl.³ ............................................. A47F 7/02
[52] U.S. Cl. ..................................... 211/13; 211/87; 248/DIG. 2
[58] Field of Search .......................... 211/13, 87, 88; 248/DIG. 2, 115

[56] References Cited

U.S. PATENT DOCUMENTS

| 579,120 | 3/1897 | Rhine | 211/88 |
|---|---|---|---|
| 1,550,486 | 8/1925 | Balmer | 211/88 |
| 2,468,437 | 4/1949 | Foley | 248/DIG. 2 X |
| 2,817,487 | 12/1957 | Wantz | 248/DIG. 2X |
| 2,997,270 | 8/1961 | Farndon | 211/13 X |
| 3,550,890 | 12/1970 | Kemp | 248/DIG. 2 X |
| 3,623,689 | 11/1971 | Johnston | 248/DIG. 2 X |
| 3,994,465 | 11/1976 | Rudnitzky | 211/88 X |

Primary Examiner—Roy D. Frazier
Assistant Examiner—Robert W. Gibson, Jr.
Attorney, Agent, or Firm—James R. Cypher

[57] ABSTRACT

An eye glass, ring and watch wall mounted holder including a mounting means for attaching the holder to a wall, an eye glass holder member connected to the base for holding eye glasses, a depression in the eye glass holder for holding rings and a watch strap holder member for holding wrist watches. In some forms of the invention a stop member which may in some cases be decorative is attached to the holder so as to prevent the eye glasses from slipping from the holder.

3 Claims, 8 Drawing Figures

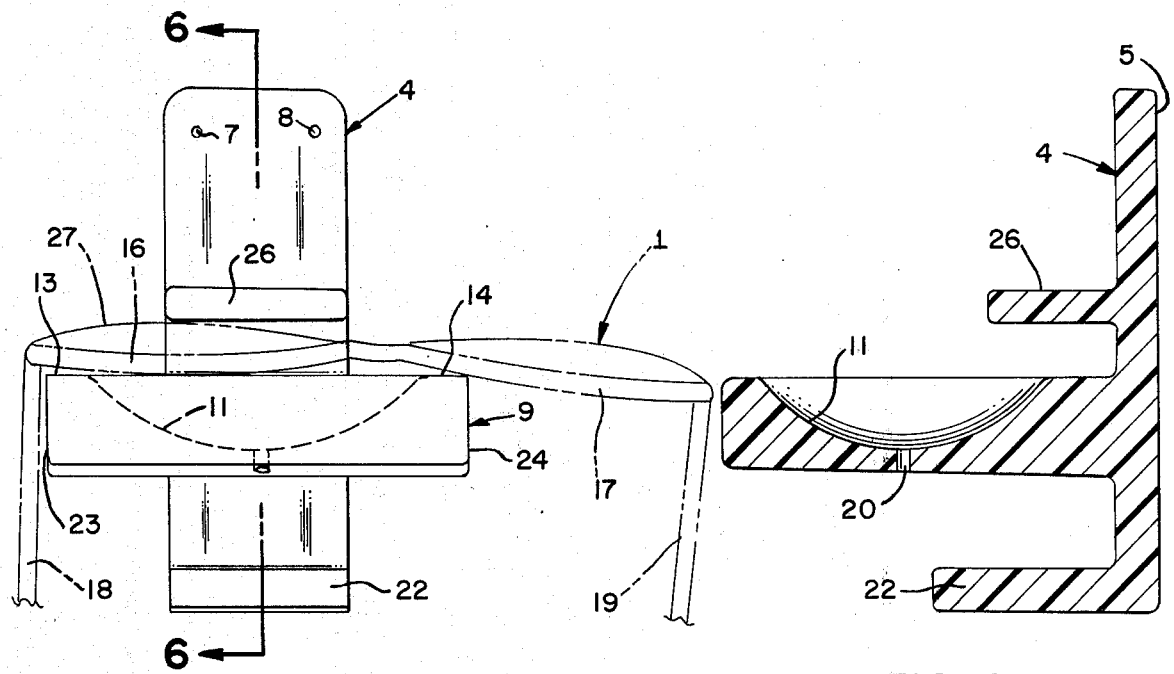
FIG. 5
FIG. 6
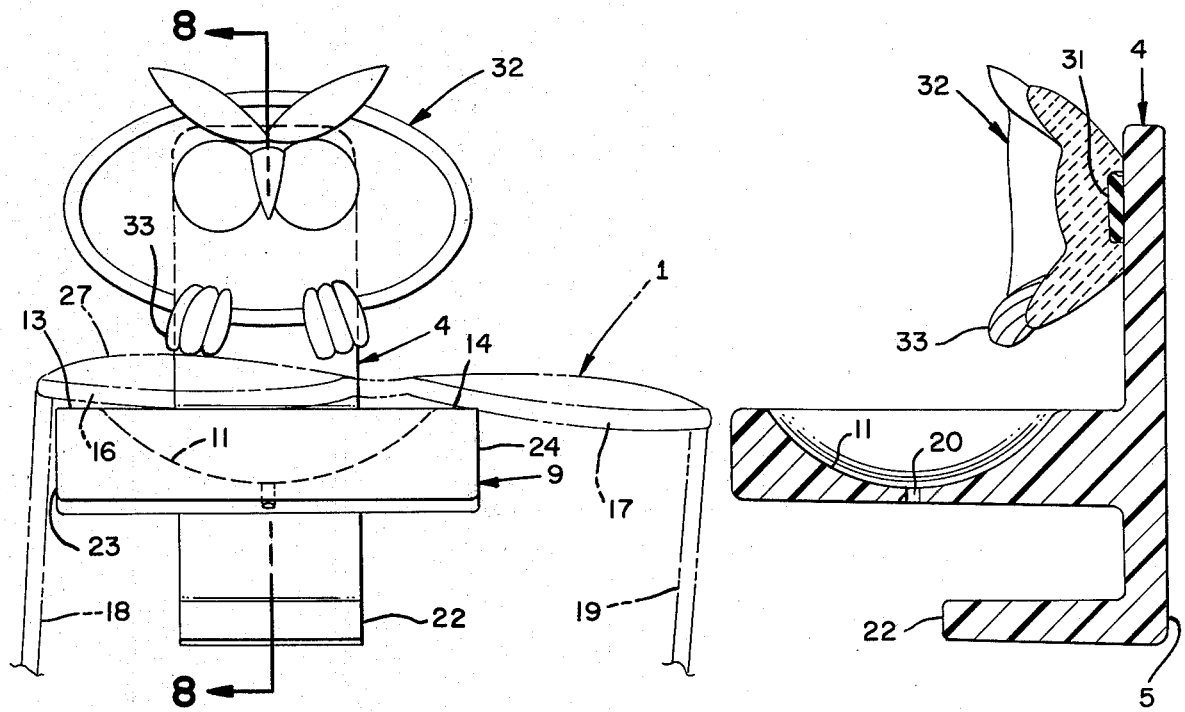
FIG. 7
FIG. 8

EYE GLASS, RING AND WATCH HOLDER

BACKGROUND OF THE INVENTION

There is presently no holder adapted for conveniently and efficiently holding a pair of eye glasses, rings and a watch which is attachable to a wall surface. Such a holder can be used in a bathroom, dressing room or adjacent a kitchen sink for the convenient temporary storage of these personal articles.

Wantz, U.S. Pat. No. 2,817,487 granted Dec. 24, 1957 discloses a spectacle holder with a wide tray for receiving lens cleaning tissues and a fluid atomizer bottle. The Wantz holder requires a relatively large shelf in order to hold all of these items and makes no attempt to combine the recess for holding the glasses with the additional function of holding rings.

Manley, U.S. Pat. No. 2,884,220, granted April 28, 1959, discloses a very efficient holder but has not capacity to hold anything but a pair of eye glasses.

Glover, U.S. Pat. No. 2,949,683, granted Aug. 23, 1960, discloses a spectacle display device. This is a single purpose device having no ability to hold anything but a pair of eye glasses.

SUMMARY OF THE INVENTION

The purpose of the present invention is to provide an inexpensive, efficient and multi-purpose device for holding eye glasses, rings and a watch.

A further object is to provide a device which can hold eye glasses even though the eye glasses are not precisely placed properly in the holder.

Still another object is to provide a holder which provides an attachment means for attaching one of the many different attractive decorative yet functional eye glass stop members which will individualize the device and increase its saleability.

BRIEF DESCRIPTION OF THE DRAWINGS

FIG. 5 is a front elevational view of an alternate form of the present invention.

FIG. 6 is a cross sectional view of the device taken along line 6—6 of FIG. 6.

FIG. 7 is a front elevational view of still another form of the invention.

FIG. 8 is a cross sectional view of the device shown in FIG. 7 taken along line 8—8.

DESCRIPTION OF THE PREFERRED EMBODIMENTS OF THE INVENTION

Figure 2:
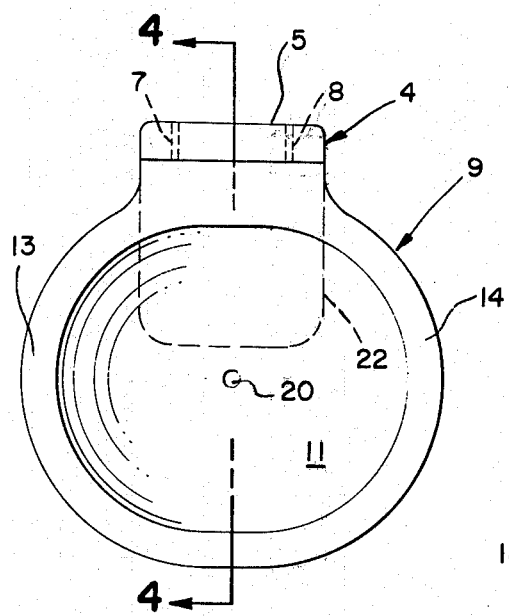
FIG. 2 is a top plan view of the device of FIG. 1.

The wall mounted holder of the present invention is specifically designed for holding a pair of eye glasses 1, rings 2 and a watch 3. The holder consists of a base 4 having a planar surface 5 for resting against a wall in a bathroom, dressing room or kitchen. The base is formed with a mounting means such as openings 7 and 8 for receipt of fasteners such as screws or nails. The mounting means could also consist of pressure sensitive adhesive backing for attachment to the wall surface. An eye glass holder member 9 is connected to the base and extends outwardly therefrom. A depression 11 is formed in the eye glass holder member and is adapted for receiving the nose guards 12 of the glasses. The eye glass holder member is formed with shoulders 13 and 14 spaced on opposite sides of the depression a distance substantially less than the distance between the ear lugs of the glasses and adapted for supporting a portion of the rims 16 and 17 of the glasses. The shoulders are spaced so that the ear lugs 18 and 19 can hang freely downwardly. The holder member depression has a depth and width sufficient and adapted to retain finger rings 2 as well as the nose guards 12 of the eye glasses.

Since the holder is designed for mounting above a kitchen or bathroom sink, the device should be formed with an opening 20 to drain any water which might splash into the holder or drip from the wet hands of the user.

Still another feature of the present invention is its usefulness in holding a wrist watch. This is accomplished by attaching a watch strap holder member 22 to the base so that it extends outwardly therefrom and is spaced below the eye glass holder member. The watch strap holder member may simply be a horizontally extending member or it may slant upwardly to prevent the watch strap from sliding off the watch strap holder member.

Figure 1:
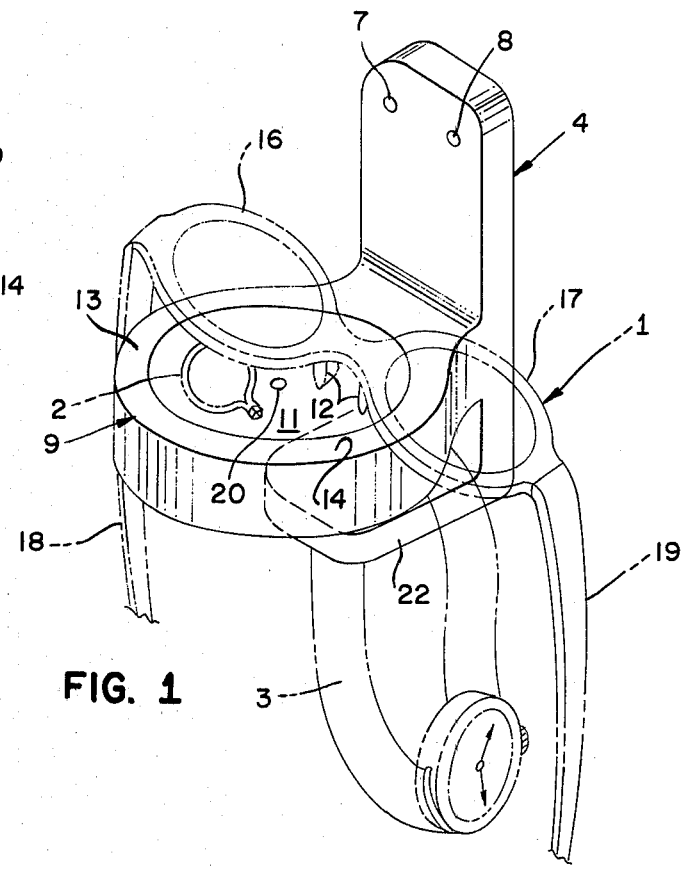
FIG. 1 is a perspective view of the device of the present invention illustrating its use in holding eye glasses, rings and a watch.
Figure 3:
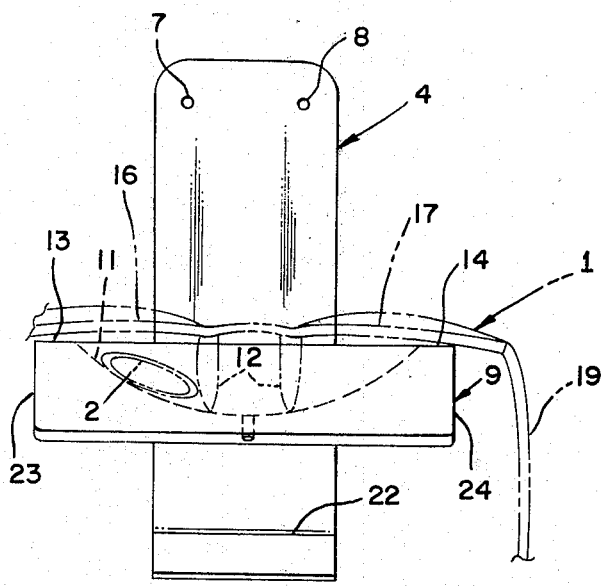
FIG. 3 is a front elevational view of the device of FIG. 1.
Figure 4:
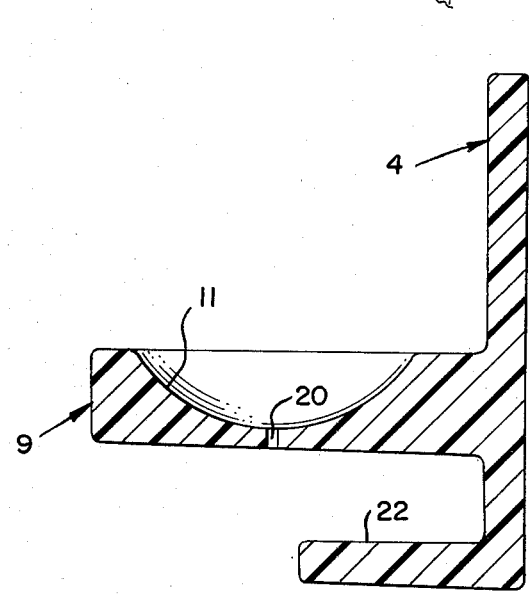
FIG. 4 is a cross sectional view taken along line 4—4 of FIG. 2.

The use of the eye glass, ring and watch holder as illustrated in FIGS. 1 through 4 is as follows: First, the device is attached to a vertical wall adjacent the sink of a bathroom or kitchen or above a dresser in a dressing room. The user should first remove his wrist watch and hang it on the watch strap holder member 22 as shown in FIG. 1. Next, one or more rings should be placed in the depression 11. Finally, the person should place his glasses with the eye lugs 18 and 19 hanging downwardly and straddling shoulders 13 and 14. Preferably the nose guards 12 are placed within the depression at its deepest point. The depression could be in the form of a rectangular opening or it could be a curvalinear shape as shown in the drawings. If the person does not place the glasses with the nose guards in the deepest area of the depression, the curvalinear surface is somewhat self-centering so that the glasses will slide so as to be centered on the device. If the person misses the center of the device substantially, the nose guards 12 will tend to catch in the depression 11 somewhere between shoulders 13 and 14. The ear lugs 18 and 19 will be held by side member 23 or 24 of the eye glass holder member.

An alternate form of the invention is shown in FIGS. 5 and 6 in which a stop member 26 is attached to base member 4. The stop member protrudes from the base member and is adapted for receiving eye glasses 1 between the stop member and the eye glass holder member 9. The purpose of the stop member is to securely hold glasses which do not have nose guards such as the pair of eye glasses 1 shown in FIG. 5. Many plastic frame glasses and half-glasses do not have nose guards. The wall mounted holder shown in FIGS. 5 and 6 is identical to the holder shown in FIGS. 1 through 4 except for the addition of the stop 26. Like parts carry identical numbers.

The holder shown in FIGS. 5 and 6 holds glasses with nose guards in the identical manner as previously described. If the glasses, however, do not have nose guards and are not placed squarely on the holder as shown in FIG. 5, there is a tendency for them to tip to the side and if the stop member 26 was not present the glasses could fall from the holder. As shown in FIG. 5, when the glasses are not placed correctly, the lens 27 abutts the underside of stop 26 and the ear lug 18 rests against side 23 of the eye glass holder member 9. Thus, the glasses can not fall from the holder. Rings can be placed in the depression 11 and a watch can be held by watch strap holder means 22 as illustrated and described above.

FIGS. 7 and 8 illustrates still another form of the invention. An attachment means such as an annular boss 31 protrudes from the base 4. A decorative stop member 32 is attached to the annular boss and protrudes from the base. The purpose of the decorative stop member is to receive the eye glasses between the stop member and the eye glass holder for preventing the eye glasses from tipping and falling out of the holder as shown in FIG. 7. The decorative stop member may be formed with an annular detent 33 for registration with the annular boss 31. The connection may be a sliding frictional fit so that the decorative stop member can be removed. The connection between the decorative stop member and the base as described above is only one of many types of connections that could be used.

The decorative stop member may be of any aesthetically attractive form. The ceramic owl shown in FIGS. 7 and 8 is for illustration purposes only. Since the holder member is to be used in homes of varying decor, it is important for marketing purposes that the holder fit the decor of the home. For this reason the basic holder is constructed in one form and may be fitted with decorative stop members of many different styles.

The operation of the decorative stop member is the same as the stop member 26 shown in FIGS. 5 and 6. Specifically, the lens 27 is held firmly by the protruding "feet 33" of the stop member and the ear lug 18 rests against the side 23 of the eye glass holder member 9.

The eye glass holder member is identical to the holder member shown in FIGS. 1 through 4 in all other respects and like members have been applied to like parts of the drawings.

As shown in FIGS. 1 and 2, shoulders 13 and 14 of eye glass holder member 9 are spaced apart a distance greater than the width of the glass holder member where it joins base member 4. The smooth transition curvature of the outer edge of the eye glass holder member 9 acts as a wedge in cooperating with stop member 26 in FIGS. 5 and 6 and stop member 33 in FIGS. 7 and 8 to prevent disengagement of the glasses from the holder when they reach an extreme askew position.

For example, if the eye glasses are in a position in which either lug 18 or 19 is located at the intersection of holder 9 and base 4, the glasses will tip and be caught by stop 26 or 33. Moreover, the glasses will not readily rotate about a vertical axis since the glasses would have to slide horizontally before they could clear one of the shoulders 13 or 14.

I claim:

1. A wall mounted eye glass, ring and watch holder comprising:
   a. a base;
   b. mounting means connected to said base and adapted for attachment to said wall surface;
   c. an eye glass holder member adapted for holding eye glasses with ear lugs connected to said base and extending outwardly therefrom, formed with a depression adapted for receiving the nose guards of said glasses and having shoulders spaced on opposite sides of said depression a distance substantially less than the distance between said ear lugs adapted for supporting a portion of the rims of said glasses;
   d. said holder member depression having a depth and width sufficient and adapted to retain finger rings; and
   e. a stop member connected to said base above said eye glass holder member and protruding therefrom at approximately the mid-portion of said eye glass holder member a distance from said base substantially less than the distance of the eye glass holder from said base and adapted for receiving said eye glasses between said stop member and said eye glass holder for preventing said eye glasses from tipping and falling out of said holder.

2. A holder as described in claim 1 including:
   a. a watch strap holder member connected to and extending outwardly from said base and spaced below said eye glass holder member.

3. A holder as described in claim 1 including:
   a. attachment means connected to said base member above said eye glass holder member; and
   b. said eye glass holder member has a width substantially greater than the width of said base presenting tapering shoulders at both sides of said device.

* * * * *